US010291682B1

(12) United States Patent
Vishwanathan et al.

(10) Patent No.: US 10,291,682 B1
(45) Date of Patent: May 14, 2019

(54) EFFICIENT TRANSMISSION CONTROL PROTOCOL (TCP) REASSEMBLY FOR HTTP/2 STREAMS

(71) Applicant: Juniper Networks, Inc., Sunnyvale, CA (US)

(72) Inventors: Suresh Vishwanathan, Bangalore (IN); Anil Kumar Reddy Sirigiri, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 287 days.

(21) Appl. No.: 15/272,930

(22) Filed: Sep. 22, 2016

(51) Int. Cl.
G06F 15/16 (2006.01)
H04L 29/06 (2006.01)
H04L 29/08 (2006.01)

(52) U.S. Cl.
CPC ............ *H04L 65/608* (2013.01); *H04L 67/02* (2013.01); *H04L 69/161* (2013.01)

(58) Field of Classification Search
USPC ........................................................ 709/235
See application file for complete search history.

(56) References Cited

U.S. PATENT DOCUMENTS

| 6,772,375 | B1* | 8/2004 | Banga | H04L 69/16 |
| | | | | 714/18 |
| 7,050,437 | B2 | 5/2006 | Bilic et al. | |
| 7,773,620 | B2* | 8/2010 | Connor | H04L 47/10 |
| | | | | 370/412 |
| 7,957,323 | B2* | 6/2011 | Uyehara | H04L 43/08 |
| | | | | 370/254 |
| 8,074,275 | B2* | 12/2011 | Ramaiah | H04L 45/54 |
| | | | | 370/394 |
| 8,792,491 | B2* | 7/2014 | Jackowski | H04L 69/32 |
| | | | | 370/389 |
| 8,971,321 | B2* | 3/2015 | Graves | H04Q 11/0005 |
| | | | | 370/389 |
| 9,501,795 | B1* | 11/2016 | Friedman | G06Q 40/06 |
| 9,596,326 | B2* | 3/2017 | Numakami | H04L 43/067 |
| 9,609,078 | B2* | 3/2017 | Zhang | H04L 67/2823 |
| 10,015,111 | B2* | 7/2018 | Graves | H04L 49/10 |
| 10,015,746 | B2* | 7/2018 | Sakai | H04W 52/0229 |
| 2009/0161568 | A1 | 6/2009 | Kastner | |
| 2015/0244765 | A1* | 8/2015 | Bellessort | H04L 67/322 |
| | | | | 709/203 |

(Continued)

OTHER PUBLICATIONS

Belshe et al., Hypertext Transfer Protocol Version 2 (HTTP/2), May 2015, IETF, RFC 7540, pp. 1-96. (Year: 2015).*

(Continued)

*Primary Examiner* — Alicia Baturay
(74) *Attorney, Agent, or Firm* — Harrity & Harrity, LLP

(57) ABSTRACT

A device may determine that a received transmission control protocol (TCP) segment includes data for a hypertext transfer protocol (HTTP) version N stream, where N is greater than or equal to 2. The device may identify, from the received TCP segment, a stream identifier for the HTTP version N stream. The device may determine that a condition is satisfied for releasing one or more TCP segments, associated with the stream identifier, from a TCP reassembly queue. The device may release the one or more TCP segments from the TCP reassembly queue based on determining that the condition is satisfied.

20 Claims, 6 Drawing Sheets

(56) References Cited

U.S. PATENT DOCUMENTS

| | | | | |
|---|---|---|---|---|
| 2015/0271233 A1* | 9/2015 | Bouazizi | ................ | H04L 65/60 |
| | | | | 709/219 |
| 2015/0358385 A1* | 12/2015 | Ruellan | .................. | H04L 67/02 |
| | | | | 709/203 |
| 2016/0198012 A1* | 7/2016 | Fablet | ................ | H04L 65/4084 |
| | | | | 709/231 |
| 2016/0330095 A1* | 11/2016 | Numakami | ............. | H04L 67/02 |
| 2016/0337400 A1* | 11/2016 | Gupta | ................. | H04L 63/1466 |
| 2017/0195427 A1* | 7/2017 | Choquette | ............... | H04L 67/28 |
| 2017/0324677 A1* | 11/2017 | Berland | .................. | H04L 67/02 |
| 2018/0052942 A1* | 2/2018 | Ikeda | ...................... | G06F 13/00 |
| 2018/0063220 A1* | 3/2018 | Dhanabalan | ............ | H04L 67/02 |
| 2018/0091631 A1* | 3/2018 | Dumoulin | ............. | H04L 69/162 |

OTHER PUBLICATIONS

Grigorik, "Making the Web Faster with HTTP 2.0," ACM Queue, Web Development 9, vol. 11, Issue 10, http://queue.acm.org/detail.cfm?id=2555617, Dec. 3, 2013, 14 pages.

M. Belshe et al., "Hypertext Transfer Protocol Version 2 (HTTP/2)," HTTPbis Working Group, Internet—Draft, https://http2.github.io/http2-spec/, May 30, 2015, 64 pages.

* cited by examiner

EFFICIENT TRANSMISSION CONTROL PROTOCOL (TCP) REASSEMBLY FOR HTTP/2 STREAMS

BACKGROUND

In a data communication network, data may be divided into segments to be communicated over the network. For example, an Internet Protocol suite-based environment includes a transport layer that may utilize Transmission Control Protocol (TCP) to divide data into segments, to control the transfer of the segments, and to reassemble the segments after transfer.

SUMMARY

According to some possible implementations, a device may include one or more processors to determine that a received transmission control protocol (TCP) segment includes data for a hypertext transfer protocol (HTTP) version N stream, where N is greater than or equal to 2. The one or more processors may identify, from the received TCP segment, a stream identifier for the HTTP version N stream. The one or more processors may determine that a condition is satisfied for releasing one or more TCP segments, associated with the stream identifier, from a TCP reassembly queue. The one or more processors may release the one or more TCP segments from the TCP reassembly queue based on determining that the condition is satisfied.

According to some possible implementations, a method may include determining, by a device, that a received transmission control protocol (TCP) segment includes data for a hypertext transfer protocol (HTTP) stream. The method may include identifying, by the device and from the received TCP segment, a stream identifier for the HTTP stream. The method may include determining, by the device, that a condition is satisfied for releasing one or more TCP segments, associated with the stream identifier, from a TCP reassembly queue. The one or more TCP segments may include the received TCP segment. The method may include releasing, by the device, the one or more TCP segments from the TCP reassembly queue based on determining that the condition is satisfied.

According to some possible implementations, a non-transitory computer-readable medium may store one or more instructions that, when executed by one or more processors, cause the one or more processors to determine that a received transmission control protocol (TCP) segment includes data for a hypertext transfer protocol (HTTP) version N stream, where N is greater than 1. The one or more instructions may cause the one or more processors to identify, from the received TCP segment, a stream identifier for the HTTP version N stream. The one or more instructions may cause the one or more processors to determine that a condition is satisfied for releasing one or more TCP segments, associated with the stream identifier, from a queue. The one or more TCP segments may include the received TCP segment. The one or more instructions may cause the one or more processors to release the one or more TCP segments from the queue based on determining that the condition is satisfied.

DETAILED DESCRIPTION

The following detailed description of example implementations refers to the accompanying drawings. The same reference numbers in different drawings may identify the same or similar elements.

In a network that utilizes TCP for data communication, TCP segments may be transmitted (e.g., by a server device) over a network in a particular order but may be received (e.g., by a network device, by a client device, etc.) out of order (e.g., in a different order than the order in which the TCP segments were transmitted). A network device or client device may use a TCP reassembly queue to buffer received TCP segments until remaining and/or missing TCP segments are received, and may place the TCP segments in order before the TCP segments are processed.

TCP segments may include data that is part of an HTTP/2 stream. HTTP/2 is a version of HTTP (Hypertext Transfer Protocol) that includes a number of additions and/or changes to HTTP. In HTTP/2, multiple independent data streams (e.g., HTTP/2 streams) may be transmitted via a same TCP connection. In such a case, however, the TCP reassembly queue may be unable to differentiate between different HTTP/2 streams. As a result, TCP segments for a first HTTP/2 stream may be unnecessarily held in the TCP reassembly queue when TCP segments for a second HTTP/2 stream have not yet been received. This may be referred to as head-of-line blocking.

Implementations described herein permit differentiation between HTTP streams received in a TCP reassembly queue. In this way, processing delays may be reduced by eliminating or reducing the holding (e.g., in a TCP reassembly queue) of data from one HTTP/2 stream based on issues (e.g., out of order segments) associated with a different HTTP/2 stream, thereby reducing or eliminating head-of-line blocking delays. Furthermore, memory resources may be conserved by releasing unnecessarily held TCP segments from the TCP reassembly queue.

Figure 1A:
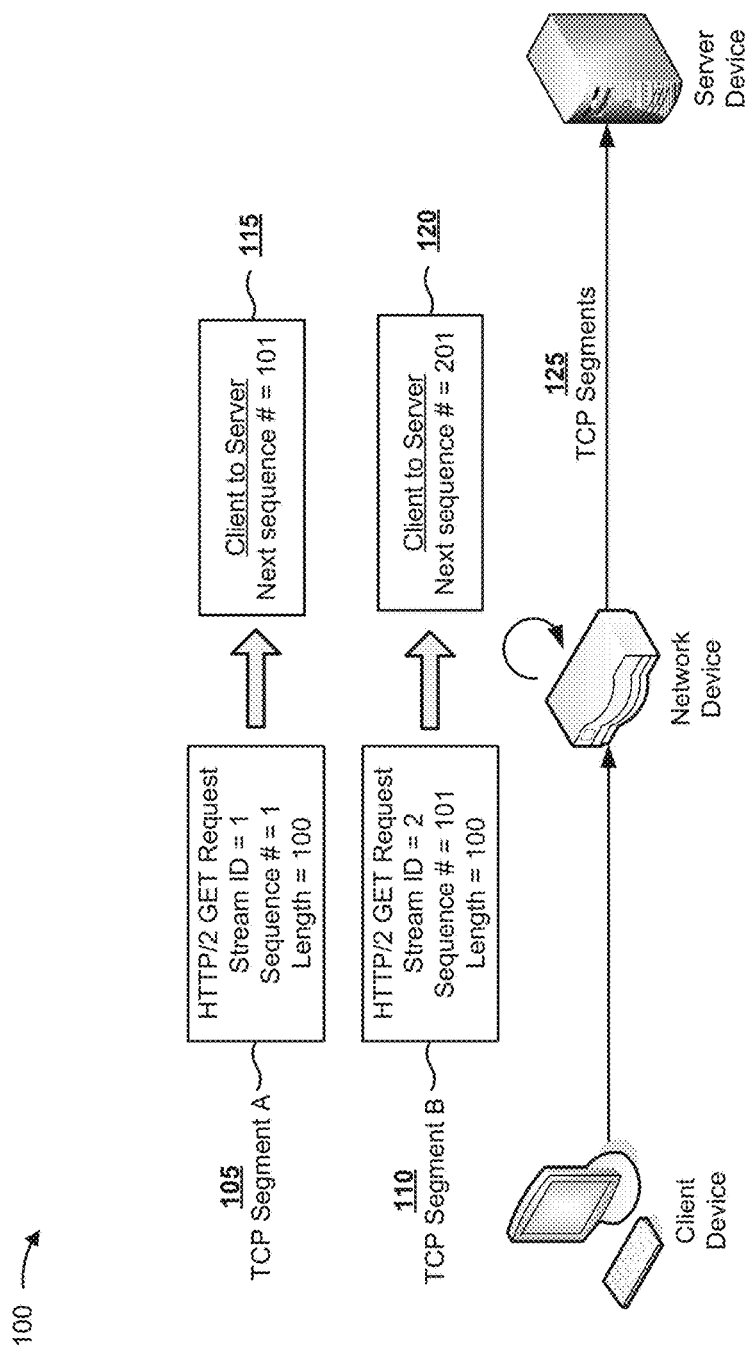
FIGS. 1A and 1B are diagrams of an overview of an example implementation described herein.
Figure 1B:
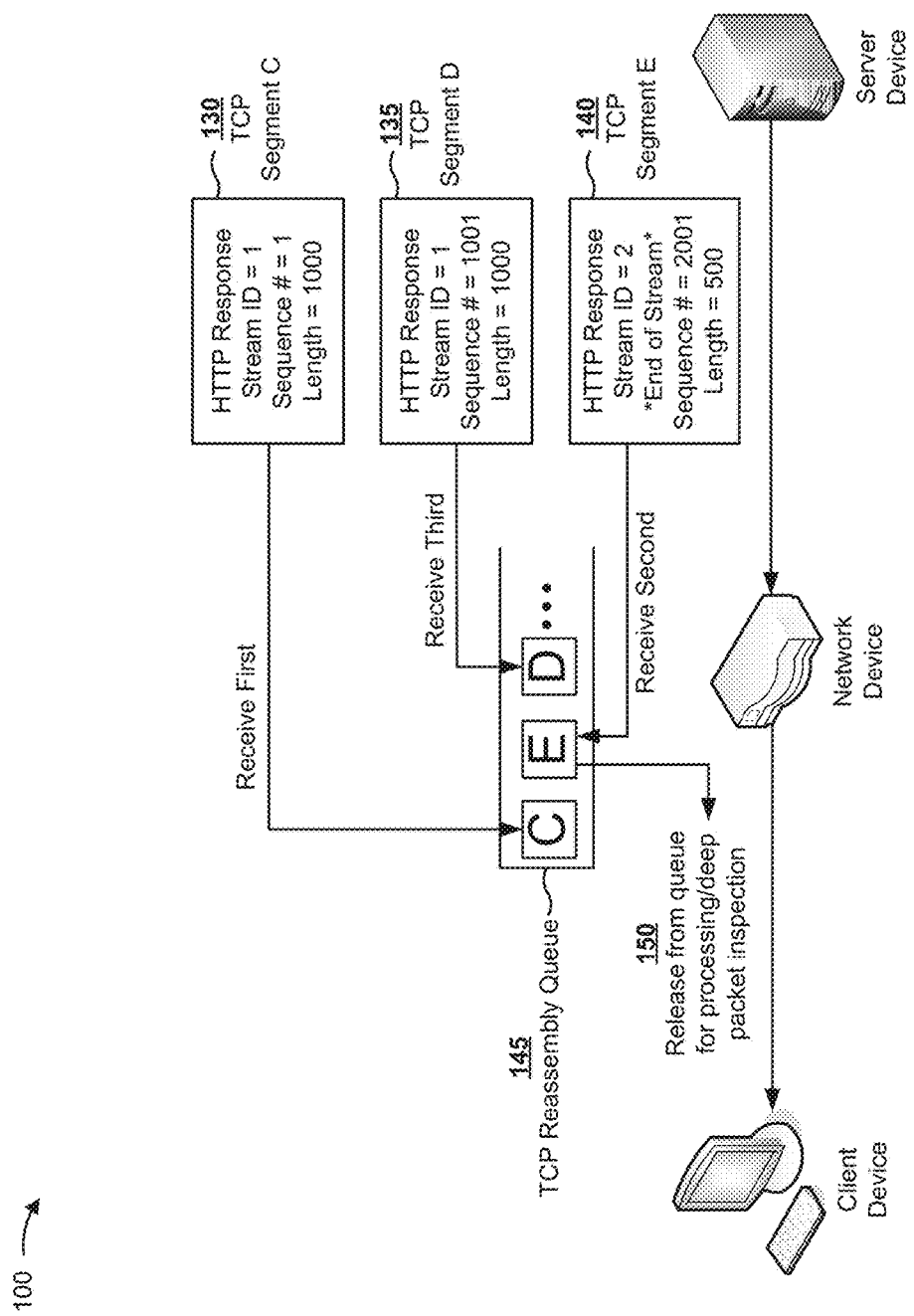

FIGS. 1A and 1B are diagrams of an overview of an example implementation 100 described herein. As shown in FIG. 1A, example implementation 100 may include a client device, a network device, and a server device. The client device and the server device may communicate, via the network device, using TCP segments. In an HTTP/2 environment, different TCP segments may include data from different HTTP/2 streams. In this case, different TCP segments may include different stream identifiers.

As an example, the client device may send TCP segment A (shown by reference number 105), which may include a first HTTP/2 GET Request. Segment A may further include a stream identifier (shown as "Stream ID"). In this case, the stream identifier has a value of 1, indicating that data carried by segment A is associated with a first data stream. Segment A may further include a sequence number (shown as "Sequence #"). In this case, the sequence number has a value of 1, indicating that data associated with the first stream begins at byte 1. Segment A may also include a length indicator (shown as "Length"). In this case, the length indicator has a value of 100, indicating that the length of the segment is 100 bytes.

Continuing with the example, the client device may also send TCP segment B (shown by reference number 110), which may include a second HTTP/2 GET Request. Segment B may further include a stream identifier (having a value of 2, indicating that data carried by segment B is associated with a second data stream). Segment B may further include a sequence number (having a value of 101, indicating that data associated with the second stream begins at byte 101). Segment B may also include a length indicator (having a value of 100, indicating that the length of the segment is 100 bytes). The network device may use the received TCP segments to determine an expected sequence number. For example, the expected sequence number of a next TCP segment in an HTTP/2 stream may be determined based on the TCP sequence number of a current TCP segment and a length of the current segment.

Continuing with the above example, as shown by reference number 115, the network device may determine the expected sequence number (shown as "Next sequence #") for a next TCP segment (after TCP segment A) to have a value of 101 (e.g., based on adding the length (100) to the sequence number (1) for segment A). Similarly, as shown by reference number 120, the network device may determine the expected sequence number for a next TCP segment after TCP segment B to have a value of 201 (e.g., based on adding the length (100) to the sequence number (101) for segment B). As shown by reference number 125, the network device may send the TCP segments to the server device.

As shown in FIG. 1B, the server device may send data to the client device, such as in response to HTTP/2 GET Requests. In some cases, the server device may send multiple TCP segments in response to a single HTTP/2 GET Request from the client. For example, the server device may send TCP segment C (shown by reference number 130) and TCP segment D (shown by reference number 135) in response to the first HTTP/2 GET Request from the client. As shown, TCP segments C and D both include a stream identifier having a value of 1, indicating that data carried by TCP segments C and D are associated with the first HTTP/2 stream.

The server device may thereafter send a single TCP Segment E (shown by reference number 140) in response to the second HTTP/2 GET Request from the client. As shown, TCP segment E includes a stream identifier having a value of 2, indicating that data carried by TCP segment E is associated with the second HTTP/2 stream. In this case, TCP segment E also includes an end-of-stream indicator, which indicates that there are no more TCP segments in response to the second HTTP/2 GET Request.

As further shown in FIG. 1B, although the server device transmits TCP segments in the order C, D, E, the network device may receive the segments in the order C, E, D. In this case, if the network device does not differentiate between HTTP/2 streams, then TCP segment E would be held in the TCP reassembly queue (shown by reference number 145) until the network device receives TCP segment D and reassembles the TCP segments in the expected order (C, D, E). However, this unnecessarily delays processing of TCP segment E and wastes memory of the queue because TCP segment E is part of an HTTP/2 stream (stream identifier=2) that is independent of the HTTP/2 stream associated with TCP segments C and D (stream identifier=1).

To avoid wasting computing resources, the network device may associate received TCP segments with an HTTP/2 stream identifier, and may release TCP segments, associated with the same HTTP stream identifier, from the queue when a condition is met. For example, the condition may be met when an indication of an end of the HTTP/2 stream is received, as shown in FIG. 1B. As another example, the condition may be met when a threshold quantity of in-order segments or bytes have been received for an HTTP stream. Upon the condition being met, as shown by reference number 150, the network device may release the TCP segments from the TCP reassembly queue for processing, such as performing a deep packet inspection. While this process is shown at the network device, a similar process may be performed for TCP reassembly at the client device.

In this way, processing delays may be reduced by eliminating or reducing the holding (e.g., in a TCP reassembly queue) of data from one HTTP/2 stream based on issues (e.g., out of order segments) associated with a different HTTP/2 stream. Furthermore, memory resources may be conserved by releasing unnecessarily held TCP segments from the TCP reassembly queue.

As indicated above, FIGS. 1A and 1B are provided merely as an example. Other examples are possible and may differ from what was described with regard to FIGS. 1A and 1B.

Figure 2:
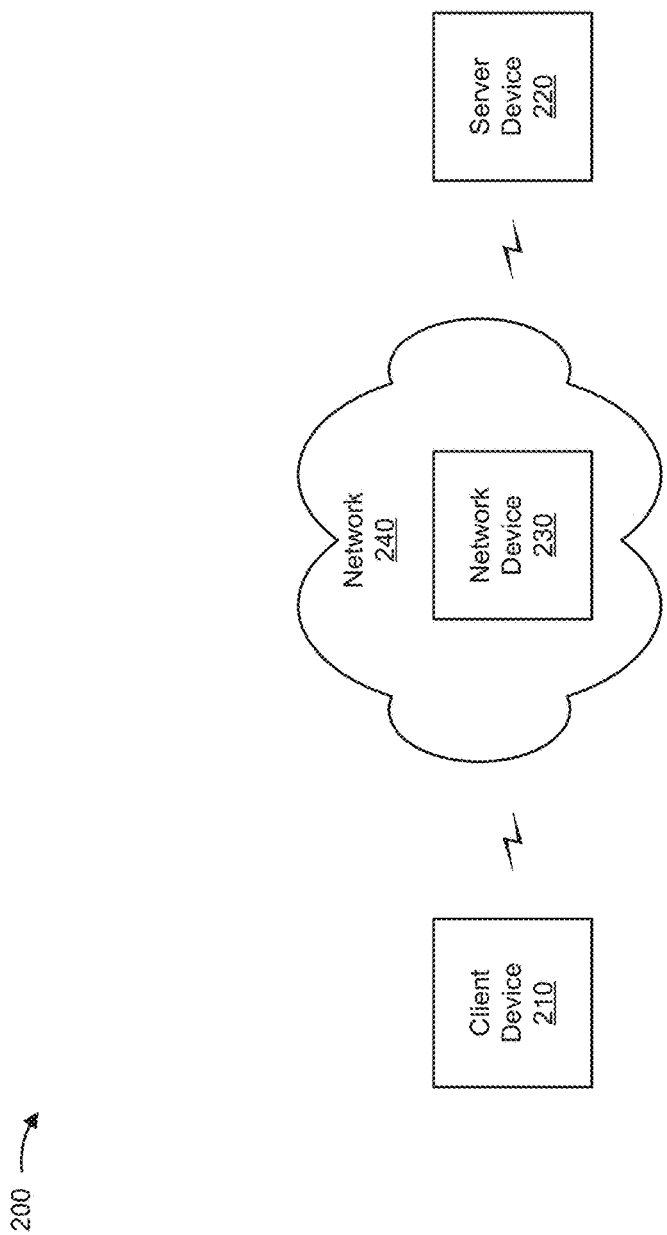
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, a network device 230, and a network 240. Devices of environment 200 may interconnect via wired connections, wireless connections, or a combination of wired and wireless connections.

Client device 210 includes one or more devices capable of receiving, generating, storing, processing, and/or providing information associated with TCP segments. For example, client device 210 may include a communication and/or computing device, such as a mobile phone (e.g., a smart phone, a radiotelephone, etc.), a laptop computer, a tablet computer, a desktop computer, a gaming device, a wearable communication device (e.g., a smart wristwatch, a pair of smart eyeglasses, etc.), or a similar type of device. In some implementations, client device 210 may perform TCP reassembly using a TCP reassembly queue, and may release TCP segments from the TCP reassembly queue for processing (e.g., for processing by client device 210, for display via a browser, or the like).

Server device 220 includes one or more devices capable of receiving, generating, storing, processing, and/or providing information associated with TCP segments. For example, server device 220 may include a server (e.g., a web server, an application server, etc.), a group of servers (e.g., in a data center, a cloud computing environment, etc.), or the like. In some implementations, server device 220 may receive multiple HTTP/2 requests from client device 210, and may respond to the multiple HTTP/2 requests with multiple independent HTTP streams, which may be transmitted via a single TCP connection with client device 210.

Network device 230 includes one or more devices (e.g., one or more traffic transfer devices) capable of processing and/or transferring traffic (e.g., between client device 210 and server device 220). For example, network device 230 may include a firewall, a router, a gateway, a switch, a hub, a bridge, a reverse proxy, a server (e.g., a proxy server), a security device, an intrusion detection device, a load balancer, or the like. In some implementations, network device 230 may perform TCP reassembly using a TCP reassembly queue, and may release TCP segments from the TCP reassembly queue for processing (e.g., for processing by network device 230, for deep packet inspection, or the like).

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
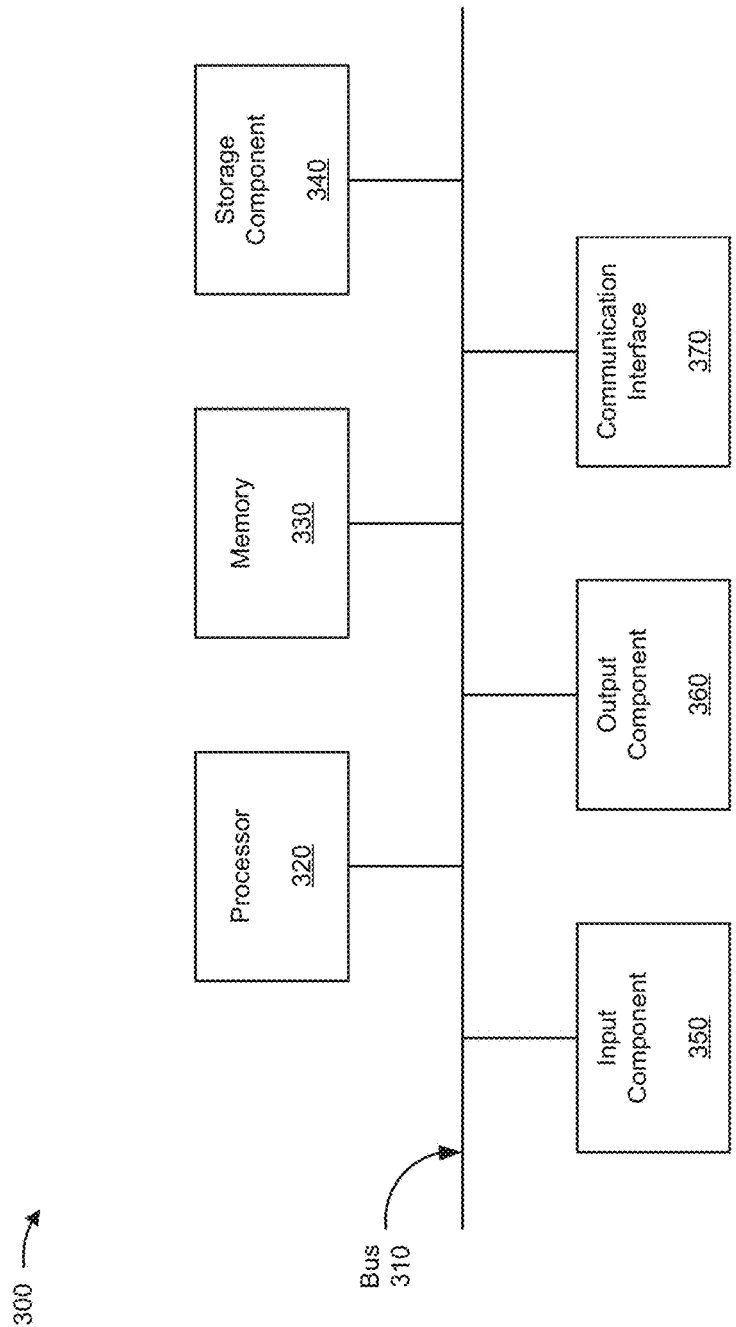
FIG. 3 is a diagram of example components of one or more devices of FIG. 2.

FIG. 3 is a diagram of example components of a device 300. Device 300 may correspond to client device 210, server device 220, and/or network device 230. In some implementations, client device 210, server device 220, and/or network device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
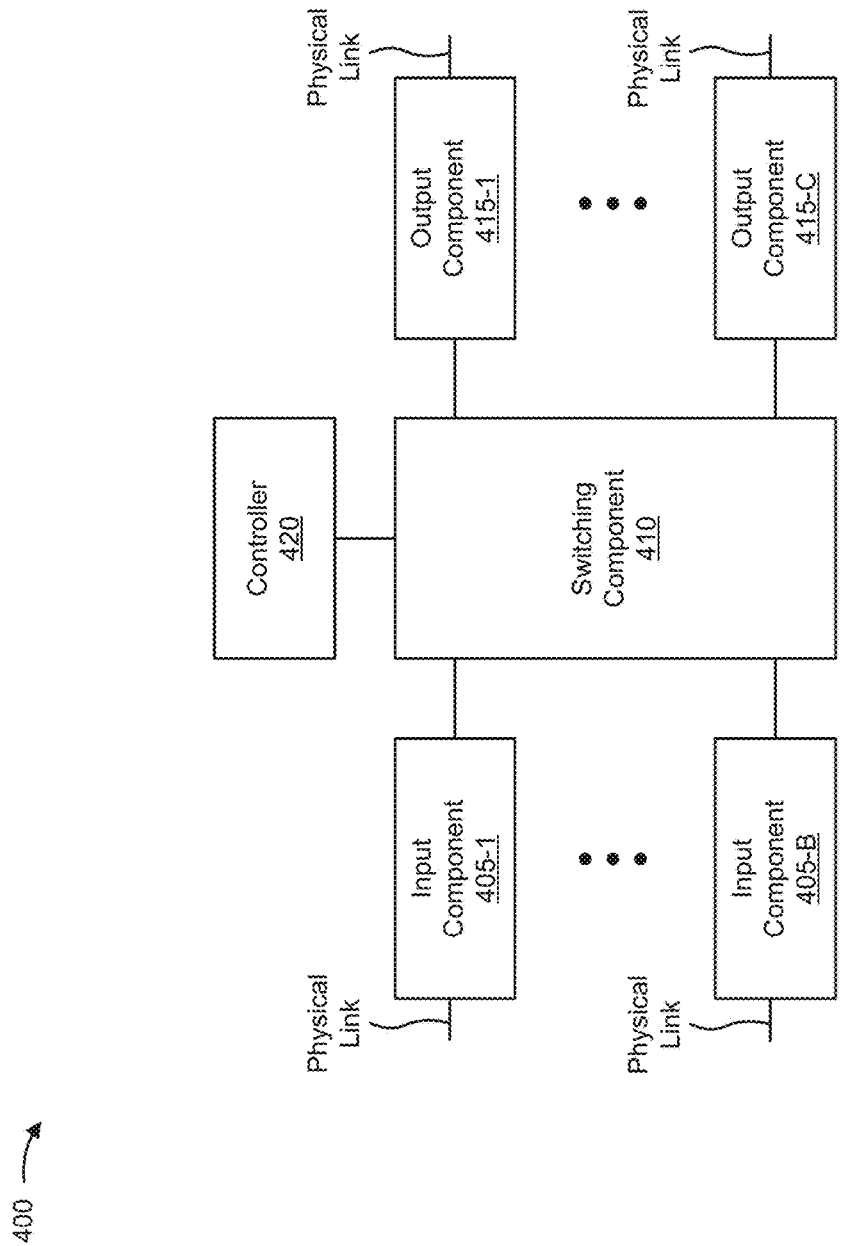
FIG. 4 is a diagram of example components of one or more devices of FIG. 2.

FIG. 4 is a diagram of example components of a device 400. Device 400 may correspond to network device 230. In some implementations, network device 230 may include one or more devices 400 and/or one or more components of device 400. As shown in FIG. 4, device 400 may include one or more input components 405-1 through 405-B (B≥1) (hereinafter referred to collectively as input components 405, and individually as input component 405), a switching component 410, one or more output components 415-1 through 415-C (C≥1) (hereinafter referred to collectively as output components 415, and individually as output component 415), and a controller 420.

Input component 405 may be points of attachment for physical links and may be points of entry for incoming traffic, such as packets. Input component 405 may process incoming traffic, such as by performing data link layer encapsulation or decapsulation. In some implementations, input component 405 may send and/or receive packets. In some implementations, input component 405 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 405.

Switching component 410 may interconnect input components 405 with output components 415. In some implementations, switching component 410 may be implemented via one or more crossbars, via busses, and/or with shared memories. The shared memories may act as temporary buffers to store packets from input components 405 before the packets are eventually scheduled for delivery to output components 415. In some implementations, switching component 410 may enable input components 405, output components 415, and/or controller 420 to communicate.

Output component 415 may store packets and may schedule packets for transmission on output physical links. Output component 415 may support data link layer encapsulation or decapsulation, and/or a variety of higher-level protocols. In some implementations, output component 415 may send packets and/or receive packets. In some implementations, output component 415 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 415. In some implementations, input component 405 and output component 415 may be implemented by the same set of components (e.g., and input/output component may be a combination of input component 405 and output component 415).

Controller 420 is implemented in hardware, firmware, or a combination of hardware and software. Controller 420 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor that can interpret and/or execute instructions. In some implementations, controller 420 may include one or more processors that can be programmed to perform a function.

In some implementations, controller 420 may include a random access memory (RAM), a read only memory (ROM), and/or another type of dynamic or static storage device (e.g., a flash memory, a magnetic memory, an optical memory, etc.) that stores information and/or instructions for use by controller 420.

In some implementations, controller 420 may communicate with other devices, networks, and/or systems connected to device 400 to exchange information regarding network topology. Controller 420 may create routing tables based on the network topology information, create forwarding tables based on the routing tables, and forward the forwarding tables to input components 405 and/or output components 415. Input components 405 and/or output components 415 may use the forwarding tables to perform route lookups for incoming and/or outgoing packets.

Controller 420 may perform one or more processes described herein. Controller 420 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 420 from another computer-readable medium or from another device via a communication interface. When executed, software instructions stored in a memory and/or storage component associated with controller 420 may cause controller 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
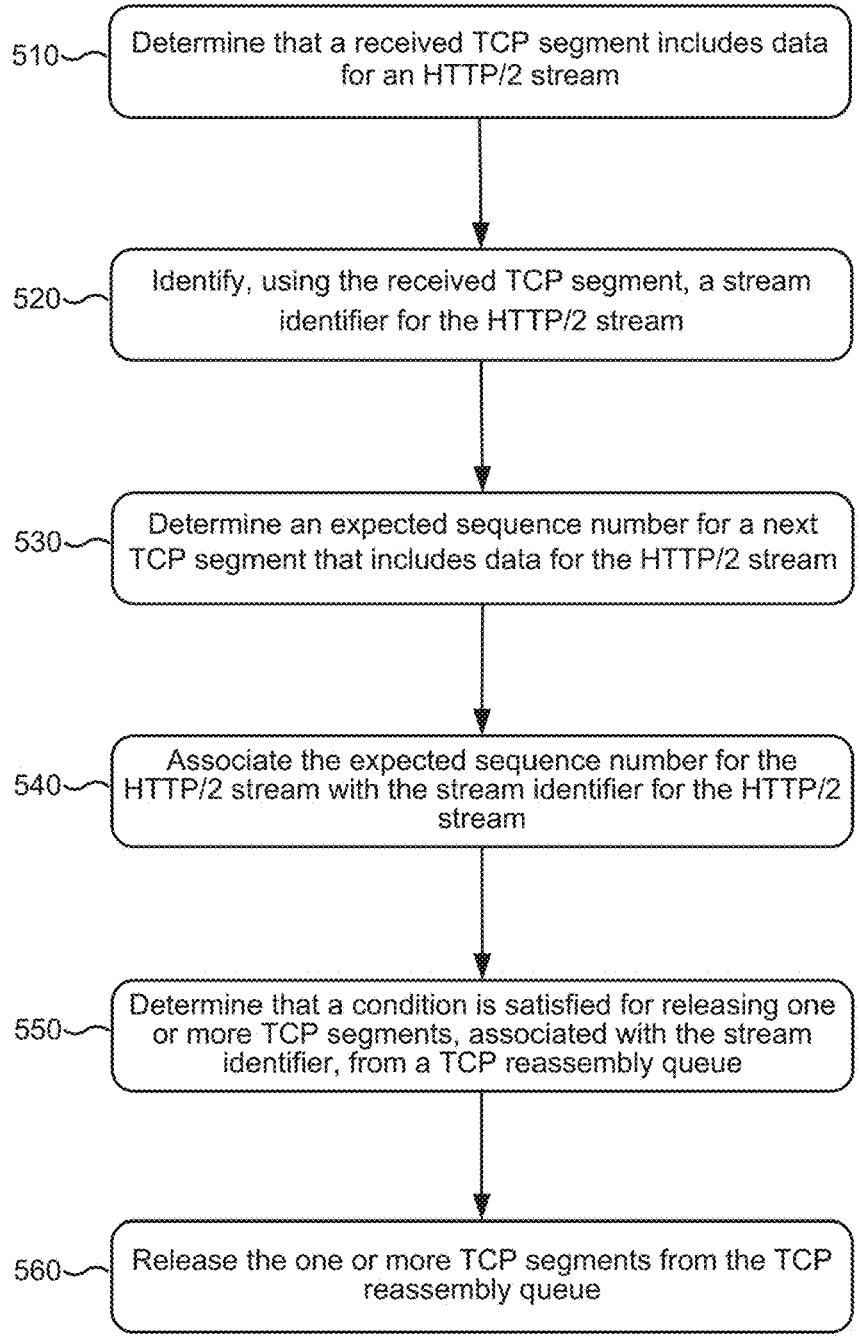
FIG. 5 is a flow chart of an example process for TCP reassembly for HTTP/2 streams.

FIG. 5 is a flow chart of an example process 500 for TCP reassembly for HTTP/2 streams. In some implementations, one or more process blocks of FIG. 5 may be performed by network device 230. In some implementations, one or more process blocks of FIG. 5 may be performed by another device or a group of devices separate from or including network device 230, such as client device 210 and/or server device 220.

As shown in FIG. 5, process 500 may include determining that a received TCP segment includes data for an HTTP/2 stream (block 510). For example, network device 230 may determine that a received TCP segment includes data for an HTTP/2 stream. In this case, network device 230 may receive TCP segments for multiple HTTP/2 streams via a single TCP connection (e.g., between client device 210 and server device 220).

In some implementations, network device 230 may read a portion of a received TCP segment (e.g., a header) to determine whether the TCP segment includes data for an HTTP/2 stream. For example, network device 230 may determine whether the TCP segment includes data for an HTTP/2 stream based on 5-tuple information (e.g., a source IP address, a destination IP address, a source port identifier, a destination port identifier, and/or a protocol identifier). In this case, the protocol identifier may identify HTTP, HTTPS, HTTP/2, another version of HTTP (e.g., HTTP/N, where N is greater than 1, or N is greater than or equal to 2), or the like.

As another example, network device 230 may determine that a received TCP segment includes data for an HTTP/2 stream based on comparing information in the TCP segment to a regular expression (e.g., a sequence that defines a search pattern). As still another example, network device 230 may determine that a received TCP segment includes data for an HTTP/2 stream based on the TCP segment including an HTTP/2 stream identifier.

As further shown in FIG. 5, process 500 may include identifying, using the received TCP segment, a stream identifier for the HTTP/2 stream (block 520). For example, network device 230 may identify, from the received TCP segment, a stream identifier for the HTTP/2 stream. In some implementations, network device 230 may extract a stream identifier (e.g., an HTTP/2 stream identifier) from contents of the TCP segment. In some implementations, network device 230 may determine a stream identifier based on contents of the TCP segment (e.g., by looking up the stream identifier in a table based on the contents of the TCP segment).

In some implementations, the stream identifier may identify an HTTP/2 stream for which the TCP segment carries data. In this case, different TCP segments being transmitted via a TCP connection may include a different stream identifier based on a different HTTP/2 stream with which the TCP segment is associated (e.g., for which the TCP segment carries data).

As further shown in FIG. 5, process 500 may include determining an expected sequence number for a next TCP segment that includes data for the HTTP/2 stream (block 530). For example, network device 230 may determine an expected sequence number for a next TCP segment that includes data for the HTTP/2 stream. In some implementations, network device 230 may determine the expected sequence number based on a sequence number of a current TCP segment and a length of the current TCP segment.

In some implementations, network device 230 may read the TCP segment to identify a sequence number of the TCP segment (e.g., from a sequence number field) and to identify a length indicator for the TCP segment (e.g., from a length field). For example, the sequence number may correspond to a starting byte of the TCP segment, and the length indicator may indicate a quantity of bytes included in the TCP segment. In this case, network device 230 may determine an expected sequence number for a next TCP segment based on the sequence number and the length of the received TCP segment (e.g., expected sequence number=current sequence number+length, or expected sequence number=current sequence number+length+1).

As further shown in FIG. 5, process 500 may include associating the expected sequence number for the HTTP/2 stream with the stream identifier for the HTTP/2 stream (block 540). For example, network device 230 may associate the expected sequence number for the HTTP/2 stream with the stream identifier for the HTTP/2 stream.

In some implementations, network device 230 may store information that identifies a relationship between the expected sequence number for the HTTP/2 stream and the stream identifier for the HTTP/2 stream. In this way, network device 230 may perform TCP reassembly on a per-HTTP/2 stream basis, and may release TCP segments for a particular HTTP/2 stream from the TCP reassembly queue without waiting for out-of-order TCP segments associated with other HTTP/2 streams. As a result, network device 230 speeds up the TCP reassembly process, speeds up processing of TCP segments, conserves memory resources of the TCP reassembly buffer, and reduces the likelihood of buffer overflow errors.

As further shown in FIG. 5, process 500 may include determining that a condition is satisfied for releasing one or more TCP segments, associated with the stream identifier, from a TCP reassembly queue (block 550). For example, network device 230 may determine that a condition is satisfied for releasing one or more TCP segments, associated with the stream identifier, from a TCP reassembly queue.

As indicated above, network device 230 may release TCP segments for an HTTP/2 stream when a condition associated with the HTTP/2 stream is satisfied. For example, network device 230 may release TCP segments upon receiving a threshold quantity of in-order TCP segments and/or bytes for an HTTP/2 stream (e.g., a threshold quantity of consecutively ordered TCP segments and/or bytes without gaps).

Additionally, or alternatively, network device 230 may release TCP segments for the HTTP/2 stream when network device 230 receives a TCP segment that includes an end-of-stream indicator for the HTTP/2 stream. For example, network device 230 may release TCP segments for the HTTP/2 stream when there are no gaps in the stream. Additionally, or alternatively, network device 230 may release TCP segments when a received sequence of TCP segments matches an expected sequence of TCP segments.

In some implementations, a first set of TCP segments for a first HTTP/2 stream may be released while a second set of TCP segments for a second HTTP/2 stream are held in the queue. In this way, network device 230 may reduce or eliminate delays that would be caused by holding the first set of TCP segments in the queue until missing TCP segments for the second HTTP/2 stream are received.

As further shown in FIG. 5, process 500 may include releasing the one or more TCP segments from the TCP reassembly queue (block 560). For example, network device 230 may release the one or more TCP segments from the TCP reassembly queue. In some implementations, network device 230 may release TCP segments associated with the HTTP/2 stream for deep packet inspection, for further processing, or the like. As a result, network device 230 speeds up the TCP reassembly process, speeds up processing of TCP segments, conserves memory resources of the TCP reassembly buffer, and reduces the likelihood of buffer overflow errors.

While process 500 has been described above as being performed by network device 230, in some implementations, process 500 may be performed by another device, such as client device 210. For example, client device 210 may release TCP segments associated with the HTTP/2 stream for processing (e.g., by a browser or another application executing on client device 210). Furthermore, while process 500 has been described above in connection with HTTP/2 (e.g., HTTP version 2.0), process 500 may apply to another type of protocol, such as HTTPS. For example, the HTTP stream may include data for an HTTPS stream, such as information associated with an HTTPS exchange of operations (e.g., as per HTTP version 2). Similarly, process 500 may apply to a future version of HTTP (such as HTTP/N, where N is greater than 1, or N is greater than or equal to 2), or the like. As used herein, HTTP may include HTTPS.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein permit differentiation between HTTP streams received in a TCP reassembly queue. In this way, processing delays may be reduced by eliminating or reducing the holding (e.g., in a TCP reassembly queue) of data from one HTTP/2 stream based on issues (e.g., out of order segments) associated with a different HTTP/2 stream. Furthermore, memory resources may be conserved by releasing unnecessarily held TCP segments from the TCP reassembly queue.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      determine that a received transmission control protocol (TCP) segment includes data for a first hypertext transfer protocol (HTTP) version N stream, N being greater than or equal to 2;
      identify, from the received TCP segment, a stream identifier for the first HTTP version N stream;
      determine that a condition is satisfied for releasing one or more TCP segments, associated with the stream identifier, from a TCP reassembly queue; and
      release, based on determining that the condition is satisfied, the one or more TCP segments, associated with the first HTTP version N stream, from the TCP reassembly queue while holding at least one TCP segment, associated with a second HTTP version N stream, in the TCP reassembly queue.

2. The device of claim 1, where the one or more processors are further to:
   determine an expected sequence number for a next TCP segment that includes data for the first HTTP version N stream; and
   where the one or more processors, when determining that the condition is satisfied, are to:
      determine that the condition is satisfied based on the expected sequence number.

3. The device of claim 1, where the device is a network device that transfers traffic between a server device and a client device; and
   where the one or more processors, when releasing the one or more TCP segments, are to:
      release the one or more TCP segments for deep packet inspection.

4. The device of claim 1, where the device is a client device; and
   where the one or more processors, when releasing the one or more TCP segments, are to:
      release the one or more TCP segments for processing by the client device.

5. The device of claim 1, where the first HTTP version N stream is an HTTP version 2 stream.

6. The device of claim 1, where the first HTTP version N stream includes data for an HTTP Secure (HTTPS) exchange of operations as per HTTP version 2.

7. The device of claim 1, where the first HTTP stream and the second HTTP stream are received via a same TCP connection.

8. A method, comprising:
   determining, by a device, that a received transmission control protocol (TCP) segment includes data for a first hypertext transfer protocol (HTTP) stream;
   identifying, by the device and from the received TCP segment, a first stream identifier for the first HTTP stream;
   determining, by the device, that a condition is satisfied for releasing one or more TCP segments, associated with the first stream identifier, from a TCP reassembly queue, the one or more TCP segments including the received TCP segment; and
   releasing, by the device and based on determining that the condition is satisfied, the one or more TCP segments, associated with the first HTTP stream, from the TCP reassembly queue while holding at least one TCP segment, associated with a second HTTP stream, in the TCP reassembly queue.

9. The method of claim 8, where
   the second HTTP stream is identified by a second stream identifier that is different from the first stream identifier.

10. The method of claim 8, where the first HTTP stream and the second HTTP stream are received via a same TCP connection.

11. The method of claim 8, where the first HTTP stream is an HTTP version N stream, where N is greater than or equal to 2.

12. The method of claim 8, where determining that the condition is satisfied comprises:
   determining that the condition is satisfied based on receiving a threshold quantity of in-order TCP segments or bytes for the first HTTP stream.

13. The method of claim 8, where determining that the condition is satisfied comprises:
   determining that the condition is satisfied based on receiving an end-of stream indicator for the first HTTP stream.

14. The method of claim 8, where determining that the condition is satisfied comprises:
   determining that the one or more TCP segments matches an expected sequence of TCP segments.

15. A non-transitory computer-readable medium storing instructions, the instructions comprising:
one or more instructions that, when executed by one or more processors, cause the one or more processors to:
determine that a received transmission control protocol (TCP) segment includes data for a first hypertext transfer protocol (HTTP) version N stream,
N being greater than 1;
identify, from the received TCP segment, a stream identifier for the first HTTP version N stream;
determine that a condition is satisfied for releasing one or more TCP segments, associated with the stream identifier, from a queue,
the one or more TCP segments including the received TCP segment; and
release, based on determining that the condition is satisfied, the one or more TCP segments, associated with the first HTTP version N stream, from the queue while holding at least one TCP segment, associated with a second HTTP version N stream, in the queue.

16. The non-transitory computer-readable medium of claim 15, where the first HTTP version N stream and the second HTTP version N stream are received via a same TCP connection.

17. The non-transitory computer-readable medium of claim 15, where the stream identifier is a first stream identifier that identifies the first HTTP version N stream; and
where the second HTTP version N stream is identified by a second stream identifier that is different from the first stream identifier.

18. The non-transitory computer-readable medium of claim 15, where the one or more instructions, when executed by the one or more processors, cause the one or more processors to:
determine an expected sequence number for a next TCP segment that includes data for the first HTTP version N stream; and
where the one or more instructions, that cause the one or more processors to determine that the condition is satisfied, cause the one or more processors to:
determine that the condition is satisfied based on the expected sequence number.

19. The non-transitory computer-readable medium of claim 15, where the one or more instructions, that cause the one or more processors to determine that the condition is satisfied, cause the one or more processors to:
determine that the condition is satisfies based on at least one of:
a threshold quantity of consecutively ordered segments or bytes being received for the first HTTP version N stream,
an end-of stream indicator being received for the first HTTP stream, or
the one or more TCP segments matching an expected sequence of TCP segments.

20. The non-transitory computer-readable medium of claim 15, where the one or more instructions, that cause the one or more processors to determine that the condition is satisfied, cause the one or more processors to:
determine that the condition is satisfied based on receiving an end-of stream indicator for the first HTTP stream.

* * * * *